(12) United States Patent
Wataya et al.

(10) Patent No.: US 6,716,524 B2
(45) Date of Patent: Apr. 6, 2004

(54) RARE EARTH BORATE AND MAKING METHOD

(75) Inventors: Kazuhiro Wataya, Takefu (JP); Miyuki Ohyama, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 9 days.

(21) Appl. No.: 10/058,115

(22) Filed: Jan. 29, 2002

(65) Prior Publication Data

US 2003/0044609 A1 Mar. 6, 2003

(30) Foreign Application Priority Data

Feb. 1, 2001 (JP) ........................................ 2001-024992

(51) Int. Cl.⁷ ................................................ B32B 5/16
(52) U.S. Cl. ....................... 428/402; 428/403; 428/404; 428/406; 423/263; 423/279; 252/301.4 R
(58) Field of Search ................................ 428/402, 403, 428/404, 406; 252/301.4 R; 423/263, 279

(56) References Cited

U.S. PATENT DOCUMENTS 6,238,593 B1 * 5/2001 Huguenin et al. .... 252/301.4 R
6,352,678 B1 * 3/2002 Huguenin et al. .......... 423/263

* cited by examiner

*Primary Examiner*—Leszek Kiliman
(74) *Attorney, Agent, or Firm*—Birch, Stewart, Kolasch & Birch, LLP

(57) ABSTRACT

A rare earth borate in the form of substantially spherical, uniform diameter particles having an average particle diameter of 0.5–2 μm is prepared by mixing substantially spherical rare earth oxide co-precipitates having an average particle diameter of 0.5–2 μm with boric acid or boron oxide, and heating the mixture at 600–1100° C. for reaction. It is a useful raw material for phosphor manufacture.

10 Claims, 5 Drawing Sheets

RARE EARTH BORATE AND MAKING METHOD

This invention relates to rare earth borates, especially yttrium-europium borates and yttrium-gadolinium-europium borates, useful as phosphor raw material, and a method for preparing the same.

BACKGROUND OF THE INVENTION

Yttrium-gadolinium-europium borate phosphor finds use in displays as a red phosphor. Especially in the recent years, engineers in the plasma display art are interested in it as a phosphor capable of light emission at a high efficiency in response to exciting radiation of 147 nm from a xenon plasma.

In general, the yttrium-gadolinium-europium borate phosphor is prepared by mixing yttrium-gadolinium-europium oxide co-precipitates with boric acid in powder form and subjecting the mixture to reaction at elevated temperature.

For such display panels as plasma display panels (PDP), to increase their brightness is an important task in improving display performance.

The brightness of panels can be increased, for example, by increasing the brightness of phosphor itself. It is believed that the brightness of panels is largely affected by the coating property of phosphor to cells. With respect to the coating property of phosphor, those phosphors which can be applied to plasma display cells in a uniform, least irregular state are regarded preferable. With respect to the shape of phosphor, particles of small size, equal diameter and identical shape are regarded preferable because uniform coating property is improved.

The particle size and shape of phosphor, especially the particle size of phosphor, depend on the particle size of a raw material or rare earth oxide. In general, using a raw material having a less variation of particle diameter or a sharper particle size distribution, a phosphor having a sharper particle size distribution is obtained. Recently, the raw material powder is thus required to have a sharper particle size distribution.

However, a microscopic observation of conventional raw material oxide revealed that even a raw material powder having a sharper particle size distribution contained particles of differing size. Such a raw material powder was regarded to have a sharp particle size distribution for the mere reason that the difference in particle size was relatively small or particles had somewhat similar shapes. The phosphor prepared from such a raw material powder contains particles of differing size.

SUMMARY OF THE INVENTION

An object of the invention is to provide a rare earth borate in the form of spherical, uniform diameter particles useful as a phosphor raw material, and a method for preparing the same.

The invention provides, in one embodiment, a rare earth borate in the form of substantially spherical, uniform diameter particles having an average particle diameter of 0.5 μm to 2 μm; in another embodiment, a yttrium-europium borate in the form of substantially spherical, uniform diameter particles having an average particle diameter of 0.5 μm to 2 μm; and in a further embodiment, a yttrium-gadolinium-europium borate in the form of substantially spherical, uniform diameter particles having an average particle diameter of 0.5 μm to 2 μm.

According to the method of the invention, a rare earth borate in the form of substantially spherical, uniform diameter particles having an average particle diameter of 0.5 μm to 2 μm is prepared by mixing yttrium-gadolinium-europium oxide co-precipitates in the form of substantially spherical, uniform diameter particles having an average particle diameter of 0.5 μm to 2 μm with boric acid or boron oxide in a molar ratio of 1/1 to 1/3, and heating the mixture at 600° C. to 1,100° C. for reaction.

The inventors previously proposed in U.S. Ser. No. 09/897,463, now pending (Japanese Patent Application No. 2000-203549) a substantially spherical rare earth oxide having a uniform particle diameter and shape and a method for preparing the same. The inventors have found that by mixing boric acid or boron oxide with the substantially spherical rare earth oxide of uniform particle diameter and uniform shape having an average particle diameter of 0.5 to 2 μm obtained by the method of the preceding application and heating the mixture for reaction, there is obtained a rare earth borate of uniform particle diameter and uniform shape, which is well suited as a phosphor raw material.

DESCRIPTION OF THE PREFERRED EMBODIMENT

The rare earth borate of the invention is in the form of substantially spherical particles having an average particle diameter of 0.5 μm to 2 μm, which have a uniform particle diameter and a uniform shape. As used herein, the term "substantially spherical particles" includes true spherical ones and ellipsoidal ones approximate thereto and encompass particles having a maximum diameter/minimum diameter ratio of from 1.0 to 1.3.

The term "uniform shape" indicates substantially spherical particles and means that when particles are observed under an electron microscope, the majority of particles are apparently spherical. The term "uniform diameter" particles means that when particles are observed under an electron microscope, the difference in diameter is less than 10% for at least 90% of the entire particles.

The average particle diameter is a particle diameter as observed under an electron microscope. It is preferred that at the same time, the average particle diameter measured by Fisher Sub-sieve Sizer, known as Fisher diameter, is in the range of 0.5 to 2 μm.

The rare earth element is selected from the group consisting of Y, Gd, Tb, Dy, Ho, Er, Tm, Yb, Lu, La, Ce, Pr, Nd, Sm, Eu, etc. A single rare earth element or a mixture of two or more rare earth elements may be used. In the preferred rare earth borate, the total content of borates of one or more elements selected from Y, Gd, Tb, Dy, Ho, Er, Tm, Yb and Lu is at least 60 mol %, and the total content of borates of one or more elements selected from La, Ce, Pr, Nd, Sm and Eu is less than 40 mol %.

Of these rare earth borates, yttrium-europium borate and yttrium-gadolinium-europium borate are especially preferred.

According to the invention, the rare earth borate is prepared by mixing a rare earth oxide in the form of substantially spherical, uniform diameter particles having an average particle diameter of 0.5 $\mu$m to 2 $\mu$m with boric acid or boron oxide, and heating the mixture for reaction.

Figure 1:
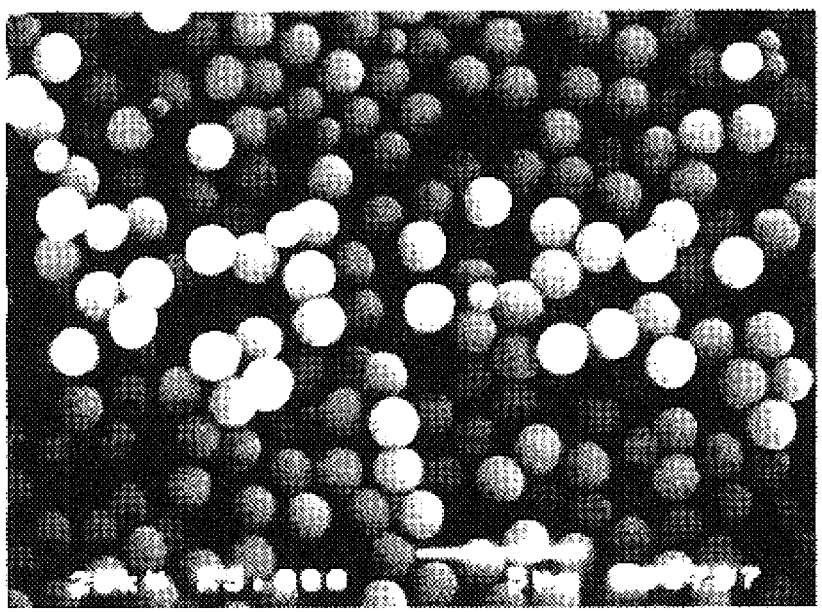
FIG. 1 is a photomicrograph of coprecipitated yttrium-gadolinium-europium oxide particles.

The rare earth oxide used as the starting material and the method for preparing the same are disclosed in U.S. Ser. No. 09/897,463 now pending. In summary, the rare earth oxide is obtained by heating and ripening an aqueous solution of water-soluble rare earth salts at a temperature of at least 80° C. while adding urea to the aqueous solution so as to keep the concentration of urea at a substantially constant level of up to 50 g/liter, thereby forming a basic rare earth carbonate, and firing the basic rare earth carbonate at about 600 to 1,000° C. into a rare earth oxide. More particularly, the coprecipitated rare earth oxide particles used as the oxide raw material for the synthesis of borate are prepared by adding urea to water-soluble rare earth salts and causing reaction to occur between them. Specifically, carbonate particles of a uniform particle diameter are coprecipitated while controlling the concentration of rare earth ions and the concentration of urea in the solution, and preferably, controlling the concentration of water-soluble rare earth salts to 20 g/liter or less and the concentration of urea to 50 g/liter or less and controlling the temperature below the boiling point of the solution. By firing the coprecipitated carbonate particles, coprecipitated rare earth oxide particles are obtained. The rare earth oxide in the form of substantially spherical, uniform diameter particles having an average particle diameter of 0.5 to 2 $\mu$m obtained by the above method, for example, monodisperse spherical yttrium-gadolinium-europium oxide particles as shown in FIG. 1 can be used as the raw material in the method of the invention. The monodisperse spherical oxide particles having an average particle diameter of 0.5 to 2 $\mu$m are mixed with boric acid or boron oxide in a molar ratio of 1/1.0 to 1/3.0, preferably 1/1.0 to 1/1.2. The mixture is fired at a temperature of 600 to 1,100° C., preferably 600 to 1,000° C., thereby forming a rare earth borate within the scope of the invention. If the proportion of boric acid or boron oxide is excessive, the fired material tends to agglomerate due to the excess boric acid. This is undesirable because the extra step of removing the excess boric acid as by water washing is necessary.

Figure 4A:
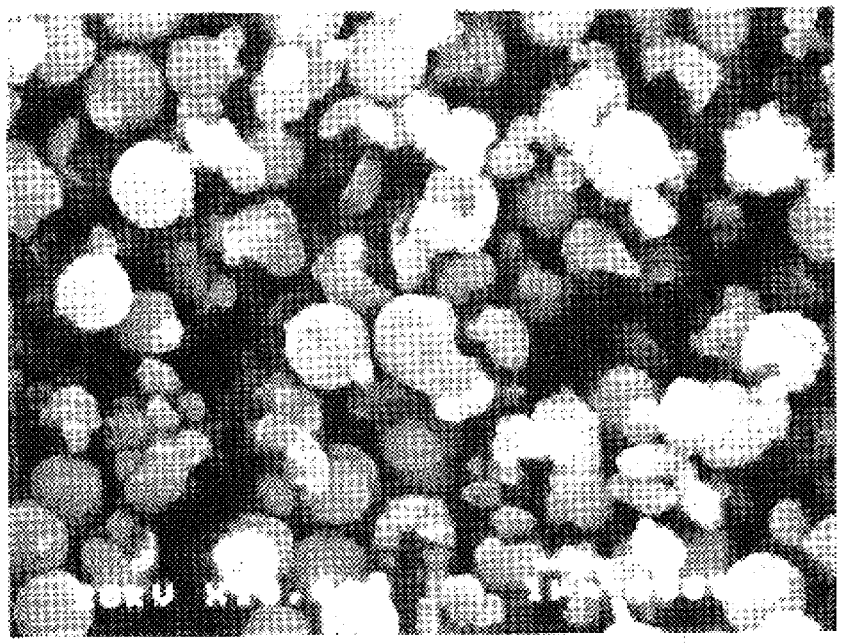
FIGS. 4A and 4B are photomicrographs of yttrium-gadolinium-europium borate particles obtained by reaction at 1200° C. of $(Y_{0.32}Gd_{0.65}Eu_{0.03})_2O_3$ with boric acid.
Figure 4B:
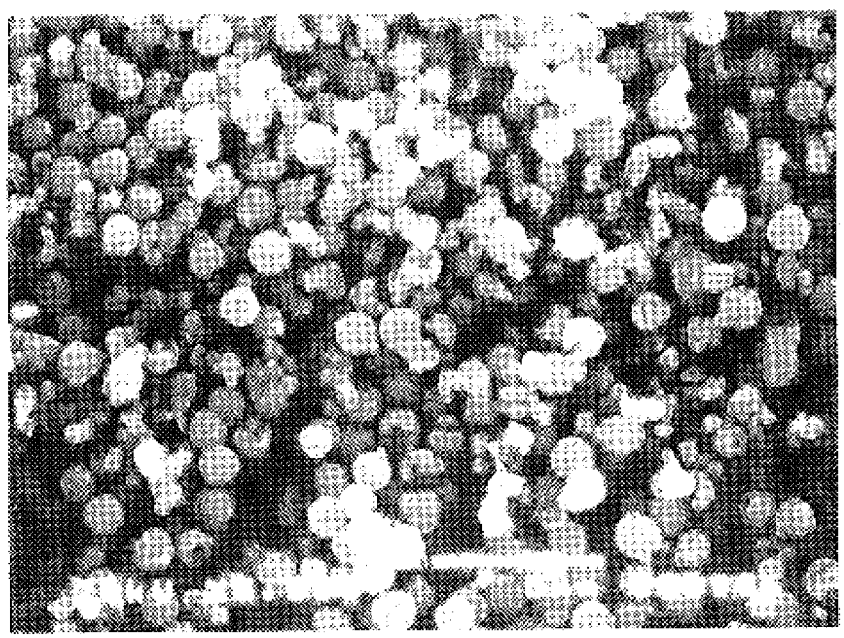

The reaction temperature necessary for synthesis is in the range of 600° C. to 1,100° C. although it varies somewhat with the composition of the starting oxide. Below 600° C., the reaction of boric acid with the starting oxide is slow, making it difficult to form a complete borate within a short time. Above 1,100° C., the reaction of boric acid with the starting oxide becomes so violent that the resulting borate contains many particles of collapsed spherical shapes as shown in FIG. 4. Note that FIG. 4 shows the particles obtained by firing at 1,200° C.

Depending on the composition of the starting oxide, the ease of reaction of boric acid with the starting oxide changes. Depending on the composition of the end phosphor, reaction may be carried out at a temperature selected in the range of 600 to 1,100° C. for a time of about 5 minutes to 10 hours, preferably about 10 minutes to 4 hours.

Figure 3:
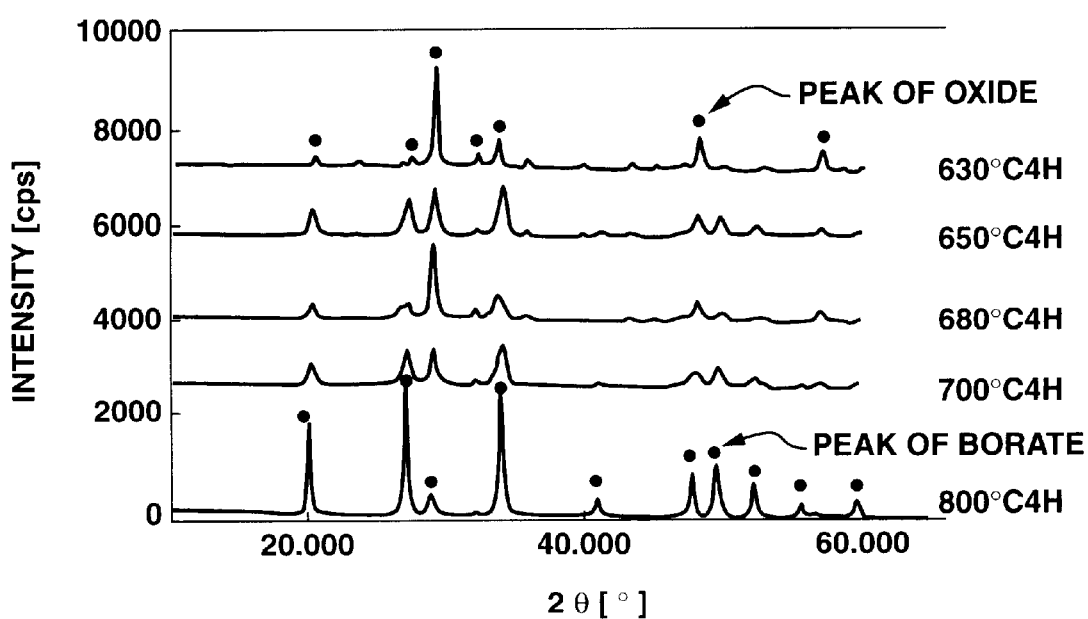
FIG. 3 is a diagram showing x-ray diffraction charts of rare earth borates obtained when $(Y_{0.32}Gd_{0.65}Eu_{0.03})_2O_3$ and boric acid were reacted at different temperatures.

Upon observation under an electron microscope, the thus obtained powder has the substantially same shape as the starting oxide and has a uniform particle diameter of 0.5 to 2 $\mu$m, preferably 0.7 to 2 $\mu$m. There is obtained a rare earth borate in the form of spherical, uniform diameter particles having little or no difference between major diameter and minor diameter as shown in FIG. 3.

In the preparation of the rare earth borate of the invention, the starting rare earth oxide used is not critical and a single rare earth oxide or compound rare earth oxides may be used. However, borates of yttrium, europium and optionally, gadolinium are preferred as mentioned above. In the borates of yttrium, europium and gadolinium, it is preferred that the ratio of gadolinium atoms to yttrium atoms be 0/1 to 5/1, more preferably 0.5/1 to 4.5/1, and the ratio of europium atoms to yttrium atoms be 0.01/1 to 0.2/1, more preferably 0.01/1 to 0.1/1, when the borates are used as the phosphor raw material. No problems arise in the preparation of borates even when the composition is outside the preferred range.

Understandably, coprecipitated yttrium-europium oxide may be used instead of the coprecipitated yttrium-gadolinium-europium oxide. A minor amount of another rare earth element or elements may be added in the preparation of borates if desired for achieving a particular purpose.

EXAMPLE

Examples of the invention are given below by way of illustration and not by way of limitation.

Reference Example

In a glass-lined vessel of 1,000 liters, an aqueous solution of a mixture of chlorides of yttrium, gadolinium and europium (Y/Gd/Eu=5/5/1 by weight) was prepared to a concentration of 8 g/liter. The solution was heated at 92° C., and urea was added so as to give an initial concentration of 40 g/liter. While the urea concentration was inspected at intervals of 30 minutes, urea was replenished so as to keep a urea concentration of approximately 40 g/liter. In this way heating was continued for 5 hours, at the end of which urea replenishment was interrupted. The solution was heated at 92° C. for a further 2 hours, and fed to a Buchner funnel, on which the precipitate was collected. The resulting cake was dried and observed under an electron microscope to find substantially monodisperse spherical particles having a particle diameter of about 2.0 $\mu$m. The Fisher diameter of the particles was also measured to be 2.0 $\mu$m which was substantially the same value as the particle diameter from electron microscope observation. Upon further analysis of the precipitate, it was found to be an amorphous basic carbonate. The cake resulting from filtration was fired at 600° C. for 10 hours, yielding an oxide. Observation under an electron microscope revealed that it was substantially monodisperse spherical particles having a particle diameter of about 1.6 $\mu$m. The Fisher diameter of the particles was also measured to be 1.55 $\mu$m.

Example 1

Figure 2A:
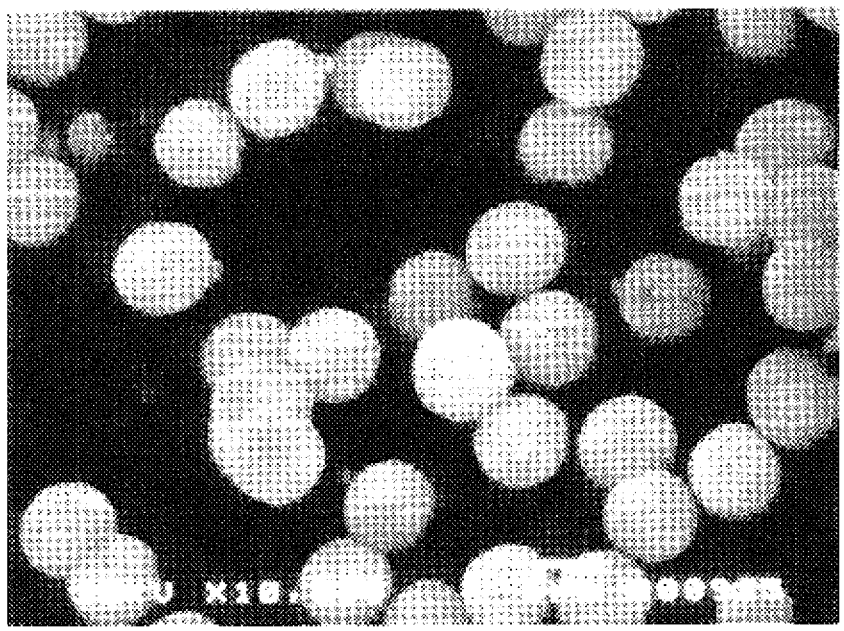
FIGS. 2A and 2B are photomicrographs of yttrium-gadolinium-europium borate particles obtained by reaction at 800° C. of $(Y_{0.32}Gd_{0.65}Eu_{0.03})_2O_3$ with boric acid.
Figure 2B:
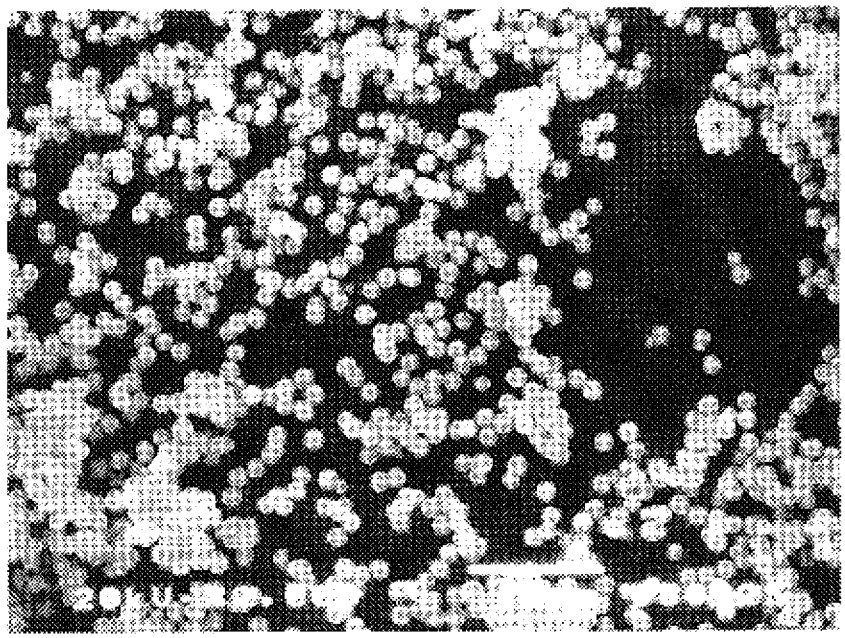

The starting oxide is substantially monodisperse, spherical, uniform diameter particles of coprecipitated yttrium-gadolinium-europium oxide (Y 0.32 mol, Gd 0.65 mol, Eu 0.03 mol) having a particle diameter of 1.0 $\mu$m as observed under an electron microscope and a Fisher diameter of 0.9 $\mu$m, which is shown in FIG. 1. A mixture of 1.0 mol of the oxide and 1.0 mol of boric acid was placed in an alumina crucible, which was closed with a lid. This sample was placed in a high-temperature firing furnace where it was heated at 800° C. for 4 hours and then cooled down. After cooling and removal from the crucible, the sample was found to be a non-agglomerated powder. Upon observation under an electron microscope as shown in FIG. 2, this powder was found to consist of spherical particles having a particle diameter of approximately 1.0 µm which was substantially equal to that of the starting oxide, and having a uniform particle diameter in that the difference in particle diameter was 5% for at least 90% of the entire particles. The powder had a Fisher diameter of 1.0 µm. A qualitative analysis of the powder by an x-ray diffraction analyzer showed that it was yttrium-gadolinium-europium borate.

FIG. 3 is a diagram showing x-ray diffraction charts of products obtained when the mixture of $(Y_{0.32}Gd_{0.65}Eu_{0.03})_2O_3$ and boric acid was reacted at various temperatures (between 630° C. and 800° C.) for 4 hours. In all runs, spherical, uniform diameter particles were obtained.

Comparative Example 1

A mixture of $(Y_{0.32}Gd_{0.65}Eu_{0.03})_2O_3$ (used in Example 1) and boric acid in a molar ratio of 1/1 was heated at 1,200° C. for 4 hours and then processed as in Example 1. The product was yttrium-gadolinium-europium borate, but not in the form of spherical, uniform diameter particles because the particles collapsed during the firing step.

Example 2

The starting oxide is substantially monodisperse, spherical, uniform diameter particles of coprecipitated yttrium-europium oxide (Y 0.95 mol, Eu 0.05 mol) having a particle diameter of 1.0 µm as observed under an electron microscope and a Fisher diameter of 1.0 µm. A mixture of 1.0 mol of the oxide and 1.0 mol of boric acid was processed as in Example 1. A non-agglomerated powder was obtained, which was found to consist of spherical particles having a particle diameter of approximately 1.0 µm which was substantially equal to that of the starting oxide, and having a uniform particle diameter in that the difference in particle diameter was 5% for at least 90% of the entire particles.

Figure 5:
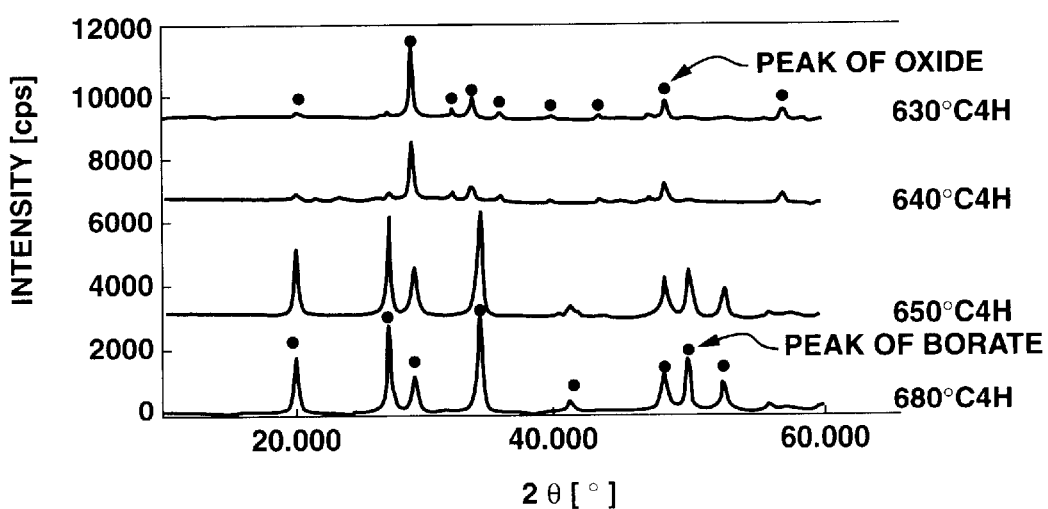
FIG. 5 is a diagram showing x-ray diffraction charts of rare earth borates obtained when $Y_{1.9}Eu_{0.1}O_3$ and boric acid were reacted at different temperatures.

FIG. 5 is a diagram showing x-ray diffraction charts of products obtained when the same mixture was reacted at various temperatures (between 630° C. and 680° C.) for 4 hours.

According to the invention, a rare earth borate can be economically produced from the starting oxide by a simple method. The rare earth borate takes the form of substantially spherical particles having a uniform particle diameter (and substantially the same particle diameter as the starting oxide) and uniform shape and is thus useful as a raw material for phosphor. The invention is thus of great worth in the industry.

Japanese Patent Application No. 2001-024992 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A rare earth borate in the form of substantially spherical, uniform diameter particles having an average particle diameter of 0.5 µm to 2 µm and a maximum diameter/minimum diameter ratio of from 1.0 to 1.3 as observed under an electron microscope.

2. A yttrium-europium borate in the form of substantially spherical, uniform diameter particles having an average particle diameter of 0.5 µm to 2 µm and a maximum diameter/minimum diameter ratio of from 1.0 to 1.3 as observed under an electron microscope.

3. A yttrium-gadolinium-europium borate in the form of substantially spherical, uniform diameter particles having an average particle diameter of 0.5 µm to 2 µm and a maximum diameter/minimum diameter ratio of from 1.0 to 1.3 as observed under an electron microscope.

4. A method for preparing a rare earth borate in the form of substantially spherical, uniform diameter particles having an average particle diameter of 0.5 µm to 2 µm, comprising the steps of:

mixing yttrium-gadolinium-europium oxide co-precipitates in the form of substantially spherical, uniform diameter particles having an average particle diameter of 0.5 µm to 2 µm with boric acid or boron oxide in a molar ratio of 1/1 to 1/3, and heating the mixture at 600° C. to 1,100° C. for reaction.

5. The method of claim 4, wherein the yttrium-gadolinium-europium oxide co-precipitate particles are prepared by adding urea to water-soluble rare earth salts.

6. The method of claim 5, wherein the concentration of water-soluble rare earth salts is controlled to 20 g/liter or less, the concentration or urea is controlled to 50 g/liter or less, and the temperature is controlled to below the boiling point of the solution.

7. The rare earth borate of claim 1, wherein a rare earth oxide obtained by a reaction between water-soluble rare earth salt and urea is used as a stating material for said rare earth borate.

8. The rare earth borate of claim 1, comprising at least 60 mol % of borates of elements selected from the group consisting of Y, Gd, Tb, Dy, Ho, Er, Tm, Yb, Lu, and mixtures thereof and less than 40 mol % of borates selected from the group consisting of La, Ce, Pr, Nd, Sm, Eu, and mixtures thereof.

9. The rare earth borate of claim 1, having a uniform particle diameter of 0.7 to 2 µm.

10. A yttrium-gadolinium-europium borate in the form of substantially spherical, uniform diameter particles having an average particle diameter of 0.5 µm to 2 µm, wherein the ratio of gadolinium atoms to yttrium atoms ranges from 0.5/1 to 4.5/1 and the ratio of europium atoms to yttrium atoms ranges from 0.01/1 to 0.1/1.

* * * * *